UNITED STATES PATENT OFFICE

RAINALD BRIGHTMAN AND PERCY CHORLEY, OF BLACKLEY, MANCHESTER, ENGLAND, ASSIGNORS TO BRITISH DYESTUFFS CORPORATION LIMITED, OF BLACKLEY, MANCHESTER, ENGLAND.

MANUFACTURE OF DYED PRODUCTS

No Drawing. Original application filed April 16, 1928, Serial No. 270,572, and in Great Britain April 22, 1927. Divided and this application filed August 24, 1929. Serial No. 388,262.

In our copending application Serial No. 270,572, whereof the present application is a division, we have described processes of making new secondary disazo dyestuffs by combining a tetrazotized 4:4'-diaminodiphenyl mono- di- or tri-sulphide with two molecules of suitable end components, of which at least one is or contains an aminonaphthol sulphonic acid, including in this term the N-substituted derivatives thereof, directly coupled with the diaminodiphenyl sulphide residue. The other coupling component may be any of the known coupling components and either coupling component may contain an azo group. These dyestuffs are represented by the following general formula

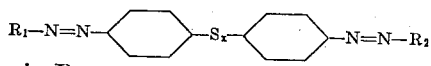

wherein $R_1$ represents a coupling component, $R_2$ represents a coupled aminonaphthol sulphonic acid and $x$ is an integer greater than 0 and less than 4. These dyestuffs are valuable for dyeing animal or vegetable fiber. The components used and the conditions of coupling may be varied to produce dyestuffs having properties suitable for certain particular uses.

We have discovered that dyestuffs having the general characteristic formula as given above are especially valuable for dyeing regenerated cellulose materials in even level shades, the fiber taking the dye directly and without need of special expedients. The ordinary dye house practice may be followed, for example the methods described in U. S. Patents 1,776,802 and 1,757,501. While these references employ dyes which differ widely in structure from the dyes of the present invention, the manipulative procedure employed for obtaining even level shades on regenerated nitrocellulose is the same. The present invention is directed to directly dyeing regenerated cellulose materials with these dyes with production of even level shades and to the dyed material produced thereby.

Regenerated cellulose materials such as viscose silk are difficult to dye. Most of the well known cotton dyestuffs will not produce even level shades. Although these cotton dyestuffs may dye or color the regenerated cellulose material, they give uneven and unlevel shades, and the dyed material is not commercially satisfactory. In recent years the industrial use of regenerated cellulose materials has increased enormously and the production of dyeings in even level shades has assumed great industrial importance. The present invention meets a demand.

As stated, the described dyes dye regenerated cellulose silk directly without need of special precautions or expedients. A wide variety of conditions may be used without detriment to the dye in result. In one particular way of dyeing with these dyes, following the general directions of the above identified patents, the procedure is as follows: A dyebath is made up from 3000 parts of water and 2 parts of the dyestuff obtained by combining 216 parts of tetrazotized 4:4'-diaminodiphenyl sulphide with 138 parts of salicylic acid and 315 parts of 2-phenylamino-8-naphthol-6-sulphonic acid successively in alkaline solution. 100 parts of viscose silk are entered into the bath cold, after which the bath is heated up to the boil, 30 parts of Glauber's salt are added and dyeing allowed to continue at or near the boil for about ½ hour. Soap may be added to the dyebath if desired. The dyeing obtained has an even level brown shade.

If instead of the above dyestuff there are used 3 parts of the dyestuff obtained by combining 216 parts of tetrazotized 4:4'-diaminodiphenyl sulphide with 138 parts of salicylic acid in alkaline solution, and then with the aminoazo compound obtained by combining 138 parts of diazotized p-nitroaniline with 319 parts of 1-amino-8-naphthol-3:6-disulphonic acid in mineral acid in the known way, the regenerated cellulose silk is dyed an even level dark green shade.

In the table given below we set forth many typical compounds of the broad class which we have found suitable for use in the present process of dyeing regenerated cellulose materials in even level shades. In the production of these compounds the coupling with the aminonaphthol sulphonic acids or their derivatives is effected in an alkaline medium unless otherwise stated. These dyestuffs may be applied to regenerated cellulose materials in the manner given above or in any other suitable way. In the last column of the table we set forth the shade on viscose silk obtained by the application thereto of these dyes.

lose materials dyestuffs having the general formula

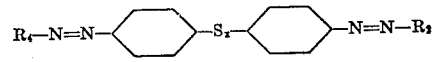

| Diamine | First coupling component | Second coupling component | Shade on viscose silk |
|---|---|---|---|
| 4:4′-diamino-diphenyl-monosulphide. | 1-amino-8-naphthol-4-sulphonic acid | 1-amino-8-naphthol-4-sulphonic acid | Reddish-violet. |
| Ditto | 2-phenylamino-5-naphthol-7-sulphonic acid | 2-phenylamino-5-naphthol-7-sulphonic acid | Bluish-red. |
| Ditto | Salicylic acid | ditto | Red. |
| Ditto | 2-amino-5-naphthol-7-sulphonic acid | 2-amino-5-naphthol-7-sulphonic-acid | Scarlet. |
| Ditto | 1-(2′:5′-dichloro-4′-sulphophenyl)-3-methyl-5-pyrazolone (acid coupled). | 2-phenylamino-8-naphthol-6-sulphonic acid | Yellowish-brown. |
| Ditto | 1-phenyl-3-methyl-5-pyrazolone (acid coupled). | 2-amino-5-naphthol-7-sulphonic acid | Scarlet. |
| Ditto | ditto | 8-hydroxy-2-naphthyl-glycine-6-sulphonic acid | Brown. |
| Ditto | 1-(4′-sulphophenyl)-3-methyl-5-pyrazolone. | 2-amino-8-naphthol-6-sulphonic acid | Brown. |
| Ditto | ditto | ditto (acid coupled) | Orange-red. |
| Ditto | ditto | 2-phenylamino-8-naphthol-6-sulphonic acid (acid coupled). | Brown. |
| Ditto | Salicylic acid | 2-amino-8-naphthol-6-sulphonic acid (acid coupled). | Scarlet. |
| Ditto | ditto | 2-acetylamino-8-naphthol-6-sulphonic acid | Scarlet. |
| 4:4′-diamino-diphenyl-disulphide. | 2-amino-5-naphthol-7-sulphonic acid | 2-amino-5-naphthol-7-sulphonic acid | Scarlet. |
| Ditto | 2-amino-8-naphthol-6-sulphonic acid | 2-amino-8-naphthol-6-sulphonic acid | Violet-brown. |
| 4:4′-diamino-diphenyl-trisulphide. | ditto | ditto | Maroon. |
| Ditto | 1-phenyl-3-methyl-5-pyrazolone (acid coupled). | 8-hydroxy-2-naphthyl-glycine-6-sulphonic acid | Light-brown. |
| Ditto | 1-(4′-sulphophenyl)-3-methyl-5-pyrazolone. | 2-amino-8-naphthol-6-sulphonic acid (acid coupled) | Yellow. |
| Ditto | Salicylic acid | 2-amino-5-naphthol-7-sulphonic acid | Orange. |
| Ditto | ditto | 2-m-xylylamino-8-naphthol-6-sulphonic acid | Brown. |
| Ditto | 2-amino-8-naphthol-6-sulphonic acid (acid coupled). | 2-amino-8-naphthol-6-sulphonic acid (acid coupled). | Maroon. |

What we claim and desire to secure by Letters Patent is:

1. The process of dyeing regenerated cellulose materials in even level shades which comprises applying to said regenerated cellulose materials dyestuffs having the general formula $$R_1-N=N-R-S_x-R-N=N-R_2$$

wherein R represents a divalent phenyl residue, $x$ is an integer greater than 0 and less than 4 and $R_1$ represents a coupling component of the benzene, naphthyl or pyrazolene series, and $R_2$ represents an aminonaphthol sulphonic acid, and in which the $-N=N-$ groups are connected to the phenyl residue in the position para to the S atom.

2. The process of dyeing regenerated cellulose materials in even level shades which comprises applying to said regenerated cellulose materials dyestuffs having the general formula

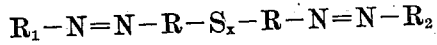

wherein $x$ is an integer greater than 0 and less than 4, $R_1$ represents a coupling component of the benzene, naphthyl or pyrazolone series, and $R_3$ represents a coupled 2:8-aminonaphthol sulphonic acid.

3. The process of dyeing regenerated cellulose materials in even level shades which comprises applying to said regenerated cellulose materials dyestuffs having the general formula

wherein $x$ is an integer greater than 0 and less than 4, $R_4$ represents a coupled salicyclic acid and $R_2$ represents an aminonaphthol sulphonic acid.

4. The process of dyeing regenerated cellulose materials in even level shades which comprises applying to said regenerated cellulose materials dyestuffs having the general formula

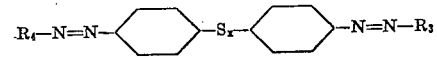

wherein $x$ is an integer greater than 0 and less than 4, $R_4$ represents a coupled salicyclic acid and $R_3$ represents a coupled 2:8-aminonaphthol sulphonic acid.

5. The process of dyeing regenerated cellulose materials in even level shades which comprises applying to said regenerated cellulose materials dyestuffs having the general formula

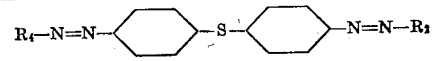

wherein $R_4$ represents a coupled salicylic acid and $R_2$ represents a coupled aminonaphthol sulphonic acid.

6. The process of dyeing regenerated cellulose materials in even level shades which comprises applying to said regenerated cellulose materials dyestuffs having the general formula

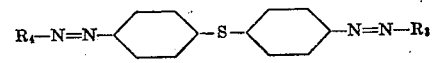

wherein $R_4$ represents a coupled salicylic acid and $R_3$ represents a coupled 2:8-aminonaphthol sulphonic acid.

7. The process of dyeing regenerated cellulose materials in even level shades which comprises applying to said regenerated cellulose materials dyestuffs having the general formula

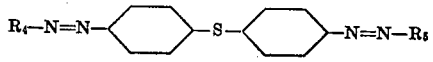

wherein $R_4$ represents a coupled salicylic acid and $R_5$ represents a coupled 2-phenylamino-8-naphthol-6-sulphonic acid.

8. Regenerated cellulose materials dyed with the dyestuffs having the general formula $$R_1-N=N-R-S_x-R-N=N-R_2$$

wherein R represents a divalent phenyl residue, $x$ is an integer greater than 0 and less than 4 and $R_1$ represents a coupling component of the benzene, naphthyl or pyrazolone series, and $R_2$ represents an aminonaphthol sulphonic acid, and in which the $-N=N-$ groups are connected to the phenyl residue in the position para to the S atom, the said dyed regenerated cellulose materials having even level shades.

9. Regenerated cellulose materials dyed with the dyestuffs having the general formula

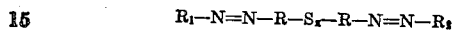

wherein $x$ is an integer greater than 0 and less than 4, $R_1$ represents a coupling component of the benzene, naphthyl or pyrazolone series, and $R_3$ represents a coupled 2:8-aminonaphthol sulphonic acid, the said dyed regenerated cellulose materials having even level shades.

10. Regenerated cellulose materials dyed with the dyestuffs having the general formula

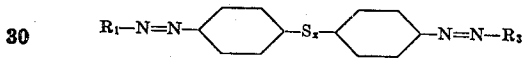

wherein $x$ is an integer greater than 0 and less than 4, $R_4$ represents a coupled salicylic acid and $R_2$ represents an aminonaphthol sulphonic acid, the said dyed regenerated cellulose materials having even level shades.

11. Regenerated cellulose materials dyed with the dyestuffs having the general formula

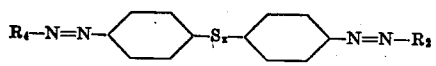

wherein $x$ is an integer greater than 0 and less than 4, $R_4$ represents a coupled salicylic acid and $R_3$ represents a coupled 2:8-aminonaphthol sulphonic acid, the said regenerated cellulose materials having even level shades.

12. Regenerated cellulose materials dyed with the dyestuffs having the general formula

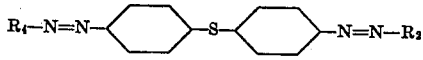

wherein $R_4$ represents a coupled salicylic acid and $R_2$ represents a coupled aminonaphthol sulphonic acid, the said regenerated cellulose materials having even level shades.

13. Regenerated cellulose materials dyed with the dyestuffs having the general formula

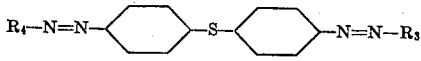

wherein $R_4$ represents a coupled salicylic acid and $R_3$ represents a coupled 2:8-aminonaphthol sulphonic acid, the said regenerated cellulose materials having even level shades.

14. Regenerated cellulose materials dyed in even level shades with the dyestuffs having the formula

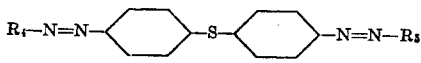

wherein $R_4$ represents a coupled salicylic acid and $R_5$ represents a coupled 2-phenyl-amino-8-napthol-6-sulphonic acid, the said regenerated cellulose materials having even level shades.

15. The process of dyeing regenerated cellulose materials in even level shades which comprises applying to said regenerated cellulose materials dyestuffs having the general formula

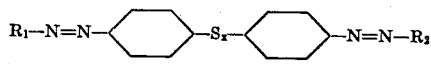

wherein $x$ is an integer greater than 0 and less than 4, $R_2$ represents an aminonaphthol sulphonic acid and $R_1$ represents a coupling component selected from a group consisting of the benzene, naphthalene and pyrazolone series.

16. The process of dyeing regenerated cellulose materials in even level shades which comprises applying to said regenerated cellulose materials dyestuffs having the general formula

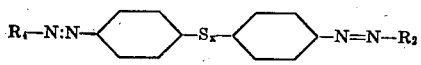

wherein $x$ is an integer greater than 0 and less than 4, $R_2$ represents an aminonaphthol sulphonic acid and $R_4$ represents a coupled salicylic acid or one of the following structures

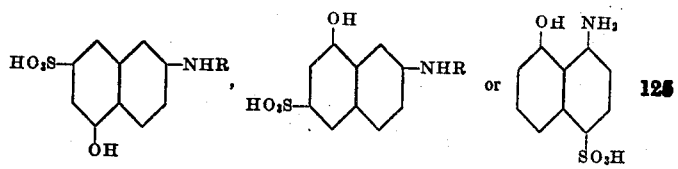

wherein R represents hydrogen, an acyl or a benzene residue.

17. The process of dyeing regenerated cellulose materials in even level shades which comprises applying to said regenerated cellulose materials dyestuffs having the general formula $$R_4-N:N-\langle\ \rangle-S_x-\langle\ \rangle-N=N-R_2$$

wherein $x$ is an integer greater than 0 and less than 4, $R_2$ represents an aminonaphthol sulphonic acid and $R_4$ represents a coupled 2-amino-8-naphthol-6-sulphonic acid, the amino group of which may be substituted with an acyl group or a benzene residue.

18. The process of dyeing regenerated cellulose materials in even level shades which comprises applying to said regenerated cellulose materials dyestuffs having the general formula $$R_4-N:N-\langle\ \rangle-S-\langle\ \rangle-N=N-R_2$$

wherein $R_2$ represents an aminonaphthol sulphonic acid and $R_4$ represents a coupled salicyclic acid or one of the following structures

[structures: HO₃S-naphthol-NHR with OH; HO₃S-naphthol with OH, NHR; naphthol with OH, NH₂, SO₃H]

wherein R represent hydrogen, an acyl or a benzene residue.

19. The process of dyeing regenerated cellulose materials in even level shades which comprises applying to said regenerated cellulose materials dyestuffs having the general formula $$R_4-N:N-\langle\ \rangle-S-\langle\ \rangle-N=N-R_2$$

wherein $R_2$ represents an aminonaphthol sulphonic acid and $R_4$ represents a coupled 2-amino-8-naphthol-6-sulphonic acid, the amino group of which may be substituted with an acyl group or a benzene residue.

20. Regenerated cellulose materials dyed with dyestuffs having the general formula $$R_1-N=N-\langle\ \rangle-S_x-\langle\ \rangle-N=N-R_2$$

wherein $x$ is an integer greater than 0 and less than 4, $R_2$ represents an aminonaphthol sulphonic acid and $R_1$ represents a coupling component selected from a group consisting of the benzene, naphthalene and pyrazolone series, the said dyed regenerated cellulose materials having even level shades.

21. Regenerated cellulose materials dyed with the dyestuffs having the general formula $$R_4-N:N-\langle\ \rangle-S_x-\langle\ \rangle-N:N-R_2$$

wherein $x$ is an integer greater than 0 and less than 4, $R_2$ represents an aminonaphthol sulphonic acid and $R_4$ represents a coupled salicylic acid or one of the following structures

[structures: HO₃S-naphthol-NHR with OH; HO₃S-naphthol with OH, NHR; naphthol with OH, NH₂, SO₃H]

wherein R represents hydrogen, an acyl or a benzene residue, the said dyed regenerated cellulose materials having even level shades.

22. Regenerated cellulose materials dyed with the dyestuffs having the general formula $$R_4-N:N-\langle\ \rangle-S_x-\langle\ \rangle-N:N-R_2$$

wherein $x$ is an integer greater than 0 and less than 4, $R_2$ represents an amino naphthol sulphonic acid and $R_4$ represents a coupled 2-amino-8-naphthol-6-sulphonic acid, the amino group of which may be substituted with an acyl group or a benzene residue.

23. Regenerated cellulose materials dyed with the dyestuffs having the general formula $$R_4-N:N-\langle\ \rangle-S-\langle\ \rangle-N:N-R_2$$

wherein $R_2$ represents an aminonaphthol sulphonic acid and $R_4$ represents a coupled salicylic acid or one of the following structures

[structures: HO₃S-naphthol-NHR with OH; HO₃S-naphthol with OH, NHR; naphthol with OH, NH₂, SO₃H]

wherein R represents hydrogen, an acyl or a benzene residue, the said dyed regenerated cellulose materials having even level shades.

24. Regenerated cellulose materials dyed with the dyestuffs having the general formula

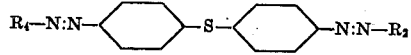

wherein $R_2$ represents an aminonaphthol sulphonic acid and $R_4$ represents a coupled 2-amino-8-naphthol-6-sulphonic acid, the amino group of which may be substituted with an acyl group or a benzene residue.

25. Regenerated cellulose materials dyed with a dyestuff having the probable formula

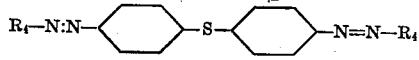

wherein $R_4$ represents a coupled 2-amino-8-naphthol-6-sulphonic acid.

26. Regenerated cellulose materials dyed with a dye-stuff having the probable formula

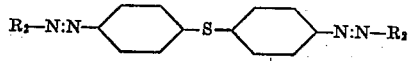

wherein $R_2$ represents a coupled 2-amino-5-naphthol-7-sulphonic acid.

In testimony whereof we affix our signatures.

RAINALD BRIGHTMAN.
PERCY CHORLEY.